(12) United States Patent
Fukuda

(10) Patent No.: US 6,625,225 B1
(45) Date of Patent: Sep. 23, 2003

(54) TRELLIS DECODER AND ASSOCIATED METHOD

(75) Inventor: Kengo Fukuda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 551 days.

(21) Appl. No.: 09/695,988

(22) Filed: Oct. 26, 2000

(30) Foreign Application Priority Data

Oct. 29, 1999 (JP) .......................................... 11-307978

(51) Int. Cl.[7] ................................................ H04L 5/12
(52) U.S. Cl. ....................... 375/265; 375/341; 714/792; 714/796
(58) Field of Search ................................. 375/265, 341, 375/262; 714/792, 794, 795, 796

(56) References Cited

U.S. PATENT DOCUMENTS

| | | | |
|---|---|---|---|
| 5,907,586 A | 5/1999 | Katsuragawa et al. | |
| 5,940,416 A | 8/1999 | Nishiya et al. | |
| 5,991,343 A | 11/1999 | Oh et al. | |
| 6,141,384 A | * 10/2000 | Wittig et al. ................. | 375/265 |

* cited by examiner

Primary Examiner—Temesghen Ghebretinsae
(74) Attorney, Agent, or Firm—McDermott, Will & Emery

(57) ABSTRACT

Disposed are a signal conversion circuit for converting a received signal point into a converted signal point in a first quadrant on a complex plane and for outputting a quadrant signal representative of a quadrant where the received signal point is situated, a branch metric arithmetic circuit for deciding the maximum likelihood between the converted signal point and a subset signal point and for outputting a branch metric and a subset decision signal, an ACS (Add Compare Selection) circuit for performing arithmetic operations to compute, from the branch metric, a path metric according to a trellis diagram and for outputting a path selection signal for selection of a path having a high likelihood, a first, a second, and a third storage circuit for storing the quadrant signal, the subset decision signal, and the path selection signal, respectively, a traceback circuit for performing traceback of these stored signals and for outputting a quadrant decoding signal, a subset decoding signal, and an encoded bit decoding signal based on the traceback results, and a reverse conversion circuit for converting, by making use of the quadrant decoding signal, the subset decoding signal to provide a non-encoded bit decoding signal.

10 Claims, 9 Drawing Sheets

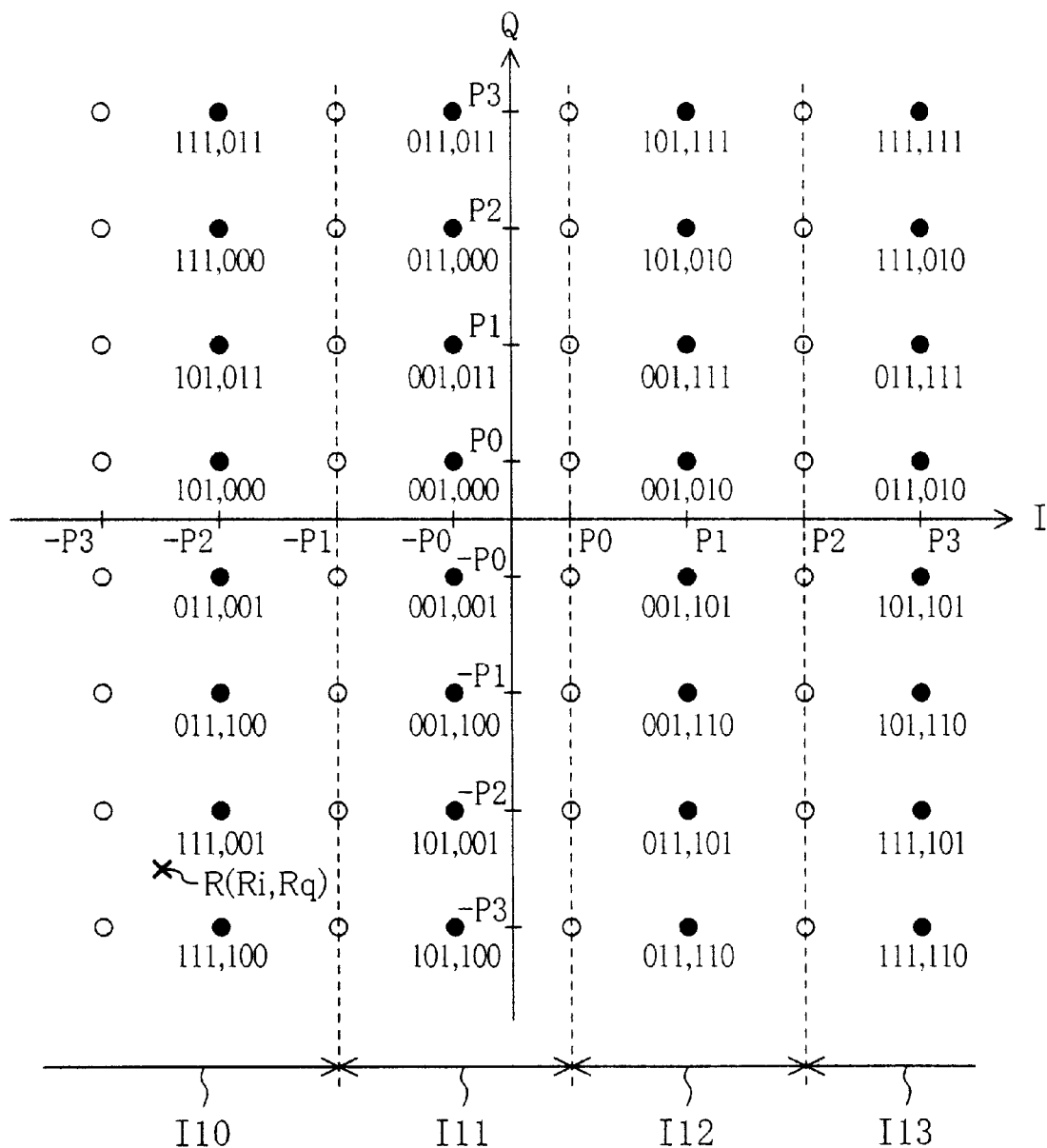

TRELLIS DECODER AND ASSOCIATED METHOD

BACKGROUND OF THE INVENTION

The present invention relates to a trellis decoder and its associated method for performing decoding of a trellis encoded modulated signal.

ANNEX B of the ITU-T RECOMMENDATION J.83 is the American standard for digital cable televisions. This ANNEX B standard employs trellis encoded modulation which is a combination of an error correcting code and a modulation process, wherein the error correcting code comprises a punctured code with a code rate of 4/5 produced from a convolutional code with a code rate of 1/2 and the modulation process is either 64 QAM (Quadrature Amplitude Modulation) or 256 QAM.

A typical conventional trellis decoder intended for use in decoding the above-described type of trellis encoded modulated signal will be explained by making reference to FIG. 7. This conventional trellis decoder comprises (a) a branch metric arithmetic circuit 701 for deciding, from an input received signal, the maximum likelihood between a received signal point and a subset signal point and for outputting a branch metric and a subset decision signal, (b) an ACS (Add Compare Select) circuit 702 for performing arithmetic operations to compute, from the branch metric output from the branch metric arithmetic circuit 701, a path metric according to a trellis diagram and for outputting a path selection signal for selection of a path having a high likelihood, (c) a first memory circuit 703 for storing the subset decision signal output from the branch metric arithmetic circuit 701, (d) a second memory circuit 704 for storing the path selection signal output from the ACS circuit 702, (e) a traceback circuit 705 for performing, from a first to a second time point, traceback of the subset decision signal and the path selection signal and for outputting, based on the traceback results, a subset decoding signal and an encoded bit decoding signal, and (f) a reverse conversion circuit 706 for outputting, from the obtained subset decoding signal, a non-encoded bit decoding signal.

The operation of the conventional trellis decoder constructed in the way described above will be explained by making reference to FIGS. 8, 9 and 10.

FIG. 8 shows signal points on a complex plane specified by a real number axis (an I axis) and an imaginary number axis (a Q axis) in 64 QAM. Each of these signal points comprises a respective signal of six bits (i.e., bits C5, C4, C3, C2, C1, and C0). The two bits C5 and C4 are I component non-encoded bits. The bit C3 is an I component encoded bit. The two bits C2 and C1 are Q component non-encoded bits. Finally, the bit C0 is a Q component encoded bit. Determination of the subset is made by the I component encoded bit C3 and the Q component encoded bit C0 in each signal point. In this example, 64 signal points are classified into four subsets.

FIGS. 9 and 10 show examples of the I component subset signal points. In the example of FIG. 9, 32 black dots represent respective subset signal points with a value C3=0. On the other hand, in the example of FIG. 10, 32 black dots represent respective subset signal points with a value C3=1. The received signal passing through a transmission channel may become a signal with interference such as noise due to the condition of the transmission channel and therefore its signal points do not always correspond to the signal points as shown in FIGS. 8–10. To cope with this, the branch metric arithmetic circuit 701 firstly decides in which of four decision regions I00, I01, I02, and I03 (FIG. 9) a received signal point R(Ri, Rq) is situated. The branch metric arithmetic circuit 701 further decides in which of four decision regions I10, I11, I12, and I13 the aforesaid received signal point R is situated. Then, the branch metric arithmetic circuit 701 outputs the decision results as an I component subset decision signal for storage in the first memory circuit 703.

Here, the four decision regions of the subset signal points (FIG. 9) are determined as follows.

−P3 Decision Region (I00): $Ri < -P2$
−P1 Decision Region (I01): $-P2 \leq Ri < -P0$
P0 Decision Region (I02): $-P0 \leq Ri < P1$
P2 Decision Region (I03): $P1 \leq Ri$ On the other hand, the four decision regions of the subset signal points (FIG. 10) are determined as follows.

−P2 Decision Region (I10): $Ri < -P1$
−P0 Decision Region (I11): $-P1 \leq Ri < P0$
P1 Decision Region (I12): $P0 \leq Ri < P2$
P3 Decision Region (I13): $P2 \leq Ri$ In the examples (FIGS. 9 and 10), the branch metric arithmetic circuit 701 decides that the received signal point R is situated in the decision region I00 (−P3) relating to subset signal points with a value C3=0 and in the decision region I10 (−P2) relating to subset signal points with a value C3=1. Further, based on a branch metric calculated from a Euclidean distance between the subset signal point with a value C3=0 (−P3) derived from the subset signal point decision and the received signal point R (such a branch metric will be hereinafter referred to as the branch metric 0), and based on a branch metric calculated from a Euclidean distance between the subset signal point with a value C3=1 (−P2) derived from the subset signal point decision and the received signal point R (such a branch metric will be hereinafter referred to as the branch metric 1), the ACS circuit 702 performs arithmetic operations to compute a path metric according to a trellis diagram and outputs a path selection signal for selection of a path having a high likelihood for storage in the second memory circuit 704.

In, FIGS. 9 and 10, the description has been made in terms of I component subset signal points. In addition, also with respect to the Q component, the maximum likelihood between the received signal point R and the Q component subset signal point with a value C0=0 and the maximum likelihood between the received signal point R and the Q component subset signal point with a value C0=1 are determined thereby to output a subset decision signal and a path selection signal for storage in the first memory circuit 703 and in the second memory circuit 704, respectively.

The traceback circuit 705 performs traceback of the subset decision signal stored in the first memory circuit 703 and the path selection signal stored in the second memory circuit 704 from a first to a second time point. Then, the traceback circuit 705 outputs an I component/Q component subset decoding signal from the traceback of the subset decision signal and an I component/Q component encoded bit decoding signal from the traceback of the path selection signal. Further, the reverse conversion circuit 706 converts the subset decoding signal to provide a non-encoded bit decoding signal.

The above-described trellis decoder configuration however suffers the problem that the branch metric arithmetic circuit 701 has to perform subset signal point decision on every decision region in all quadrants. This increases the circuit scale of compare circuits incorporated in the arithmetic circuit 701. Further, the first memory circuit 703 has to store the subset decision signal having information content about all the quadrants. This also produces the problem that the circuit scale of the memory circuit 703 becomes larger.

SUMMARY OF THE INVENTION

Accordingly, an object of the present invention is to provide a trellis decoder and its associated method capable of accomplishing reductions in the circuit scale.

In order to achieve the object, in accordance with the present invention, when performing decoding of a trellis encoded modulated signal, a received signal point is converted into a converted signal point situated in any one of all the quadrants on a complex plane specified by an I and a Q axis. Then, the result of subset signal point decision relating to the converted signal point is used to find the decoding result of the received signal.

More concretely, the present invention provides a trellis decoder which employs a configuration comprising a signal conversion means for converting a received signal point into a converted signal point situated in any one of all quadrants on a complex plane specified by an I and an Q axis and for outputting the converted signal point and a quadrant signal representative of a quadrant where the received signal point is situated, a branch metric arithmetic means for deciding, by making use of the quadrant signal, the maximum likelihood between the converted signal point and a subset signal point and for outputting a branch metric and a subset decision signal, an ACS (Add Compare Selection) means for performing arithmetic operations to compute, from the branch metric, a path metric according to a trellis diagram and for outputting a path selection signal for selection of a path having a high likelihood, a first storage means for storing the quadrant signal, a second storage means for storing the subset decision signal, a third storage means for storing the path selection signal, a traceback means for performing, from a first to a second time point, traceback of the quadrant signal stored in the first storage means, the subset decision signal stored in the second storage means, and the path selection signal stored in the third storage means and for outputting a quadrant decoding signal based on the result of the quadrant signal traceback, a subset decoding signal based on the result of the subset decision signal traceback, and an encoded bit decoding signal based on the result of the path selection signal traceback, and a reverse conversion means for converting, by making use of the quadrant decoding signal, the subset decoding signal to provide a non-encoded bit decoding signal.

The traceback means and the reverse conversion means are replaceable with a traceback means for performing, from a first to a second time point, traceback of the quadrant signal stored in the first storage means, the subset decision signal stored in the second storage means, and the path selection signal stored in the third storage and for outputting a subset decoding signal based on the result of the quadrant signal traceback and on the result of the subset decision signal traceback and an encoded bit decoding signal based on the result of the path selection signal traceback, and with a reverse conversion means for converting the subset decoding signal to provide a non-encoded bit decoding signal, respectively.

The signal conversion means performs signal point conversion either by making utilization of foldback with respect to the I axis and/or the Q axis, or by making utilization of any one of a 90, a 180, and a 270 degree rotation centered on the origin of the complex plane.

The branch metric arithmetic means performs maximum likelihood decision either by the Hamming distance or by the Euclidean distance. The use of the Euclidean distance makes it possible to decide the maximum likelihood at higher accuracy.

BRIEF DESCRIPTION OF THE DRAWINGS

FIG. 10 is another operation descriptive diagram of the conventional trellis decoder of FIG. 7.

DETAILED DESCRIPTION OF THE INVENTION

Hereinafter, a trellis decoder and its associated method according to the present invention will be explained by making use of a concrete example of the 64 QAM shown in the figure. Note that the application of the present invention is not limited to the 64 QAM. The present invention is applicable to general multivalue/phase, trellis encoded modulated signals.

Figure 1:
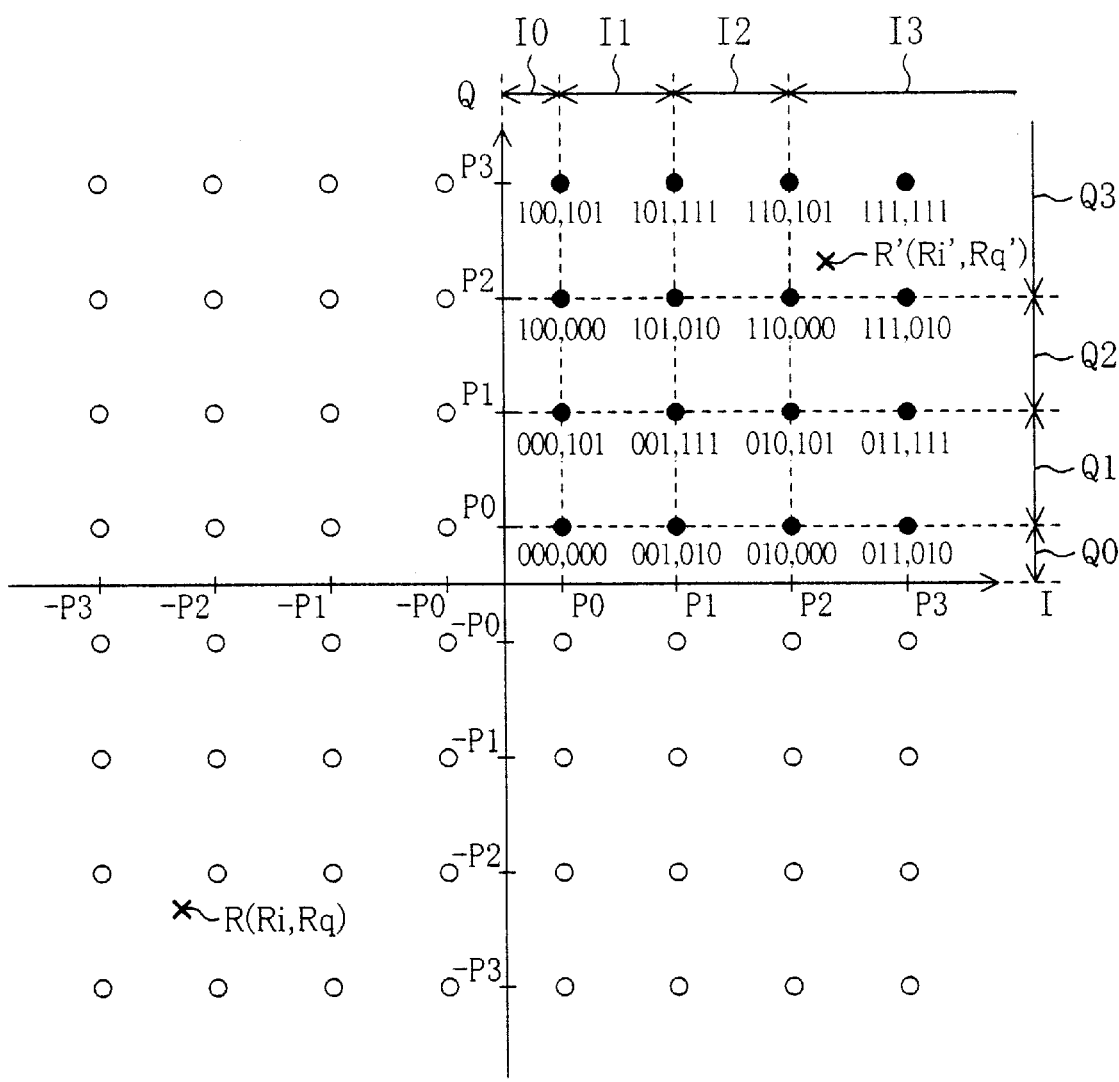
FIG. 1 is a signal point diagram explaining the principle of the present invention.

Referring to FIG. 1, there is shown the principle of the present invention. According to the present invention, when performing decoding of a trellis encoded modulated signal, firstly a received signal point R(Ri, Rq) is converted into a signal point R'(Ri', Rq') situated in any one of all quadrants (in the first quadrant in this example shown in the figure) on a complex plane specified by an I and a Q axis. In other words, when the received signal point R is situated in other than the first quadrant, either by making utilization of foldback (mirroring) with respect to the I axis and/or the Q axis or by making utilization of any one of a 90, a 180, and a 270 degree rotation centered on the origin of the complex plane, the received signal point R is converted into the signal point R' within the first quadrant. Then, decision is made to decide in which of four decision regions I0, I1, I2, and I3 the converted signal point R' is situated and the result is output as a subset decision signal for the I component. Further, a decision is made to decide in which of four decision regions Q0, Q1, Q2, and Q3 the converted signal point R' is situated and the result is output as a subset decision signal for the Q component. Then, these subset signal point decision results are used to find decoding results of the received signal.

Here, the I component decision regions are determined within the first quadrant as follows.

Decision Region I0: $0 \leq Ri' < P0$
Decision Region I1: $P0 \leq Ri' < P1$
Decision Region I2: $P1 \leq Ri' < P2$
Decision Region I3: $P2 \leq Ri'$ On the other hand, the Q component decision regions are likewise determined within the first quadrant as follows.

Figure 2:
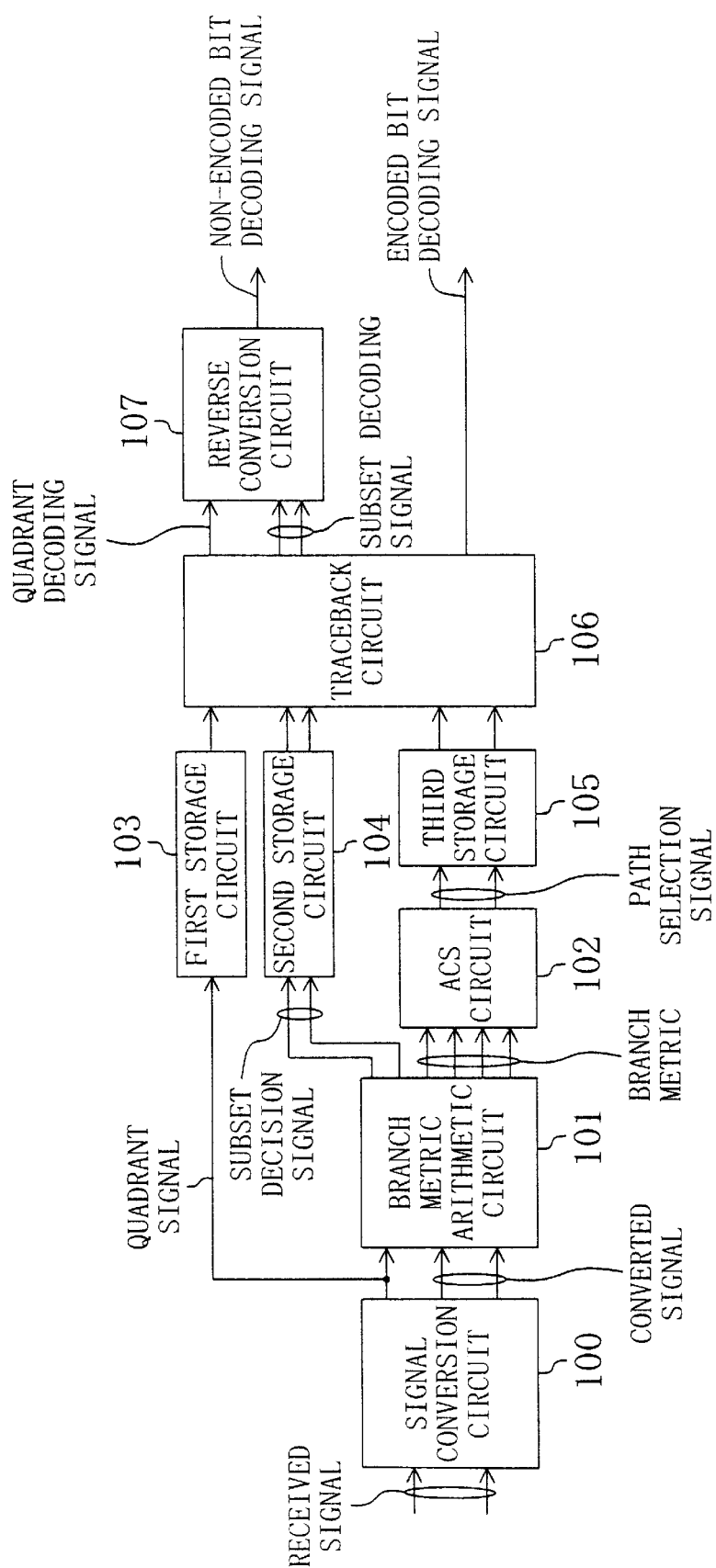
FIG. 2 is a block diagram showing an example of the configuration of a trellis decoder according to the present invention.

Decision Region Q0: $0 \leq Rq' < P0$
Decision Region Q1: $P0 \leq Rq' < P1$
Decision Region Q2: $P1 \leq Rq' < P2$
Decision Region Q3: $P2 \leq Rq'$ FIG. 2 shows an example of the configuration of the trellis decoder on the basis of the above-described principle. FIG. 2 shows a signal conversion circuit 100 for converting a received signal point into a converted signal point within the first quadrant and for outputting the conversion signal as a result of the signal point conversion and a quadrant signal representative of a quadrant where the received signal point is situated, a branch metric arithmetic circuit 101 for deciding, by making use of the quadrant signal, the maximum likelihood between the converted signal point and a subset signal point and for outputting a branch metric and a subset decision signal, an ACS (Add Compare Selection) circuit 102 for performing arithmetic operations to compute, from the branch metric, a path metric according to a trellis diagram and for outputting a path selection signal for selection of a path having a high likelihood, a first storage circuit 103 for storing the quadrant signal output from the signal conversion circuit 100, a second storage circuit 104 for storing the subset decision signal output from the branch metric arithmetic circuit 101, a third storage circuit 105 for storing the path selection signal output from the ACS circuit 102, a traceback circuit 106 for performing, from a first to a second time point, traceback of the quadrant signal stored in the first storage circuit 103, the subset decision signal stored in the second storage circuit 104, and the path selection signal stored in the third storage circuit 105 and for outputting a quadrant decoding signal based on the result of the quadrant signal traceback, a subset decoding signal based on the result of the subset decision signal traceback, and an encoded bit decoding signal based on the result of the path selection signal traceback, and a reverse conversion circuit 107 for converting, by making use of the quadrant decoding signal, the subset decoding signal to provide a non-encoded bit decoding signal.

Figure 3:
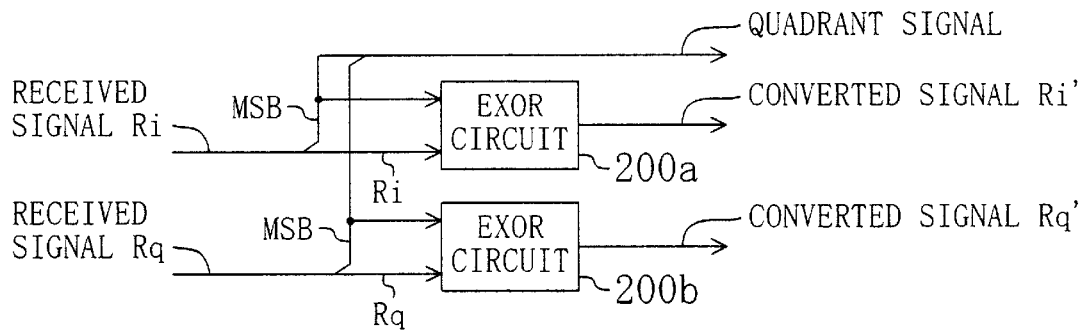
FIG. 3 is a block diagram showing in detail an example of the configuration of a signal conversion circuit in FIG. 2.

Reference is now made to FIG. 3 which shows in detail an example of the configuration of the signal conversion circuit 100 in FIG. 2. The signal conversion circuit 100 of FIG. 3 converts, when the received signal point R(Ri, Rq) is situated in other than the first quadrant, the received signal point R into the signal point R' (Ri', Rq') in the first quadrant by making utilization of foldback with respect to the I axis and/or the Q axis. The signal conversion circuit 100 comprises two EXOR circuits 200a and 200b. The rules of signal point conversion in such a case are as follows.

(1) If R is in the first quadrant, then R is not altered and becomes R'. That is:

$(Ri', Rq')=(Ri, Rq)$;

(2) If R is in the second quadrant, then R is subjected to foldback with respect to the Q axis and becomes R'. That is:

$(Ri', Rq')=(Ri'', Rq)$;

(3) If R is in the third quadrant, then R is subjected to foldback with respect to the I axis and the Q axis and becomes R'. That is:

$(Ri', Rq')=(Ri'', Rq'')$;

and (4) If R is in the fourth quadrant, then R is subjected to foldback with respect to the I axis and becomes R'. That is:

$(Ri', Rq')=(Ri, Rq'')$;

where Ri" and Rq" are components derived from subjecting the I component Ri and the Q component Rq of the received signal point R to one's complement processing. The sign bit (MSB) of each of the components Ri and Rq is used to decide in which of the quadrants the received signal point R is situated. The signal conversion circuit 100 outputs both the sign bits used in such quadrant decision, as a 2-bit quadrant signal for storage in the first storage circuit 103.

Figure 4:
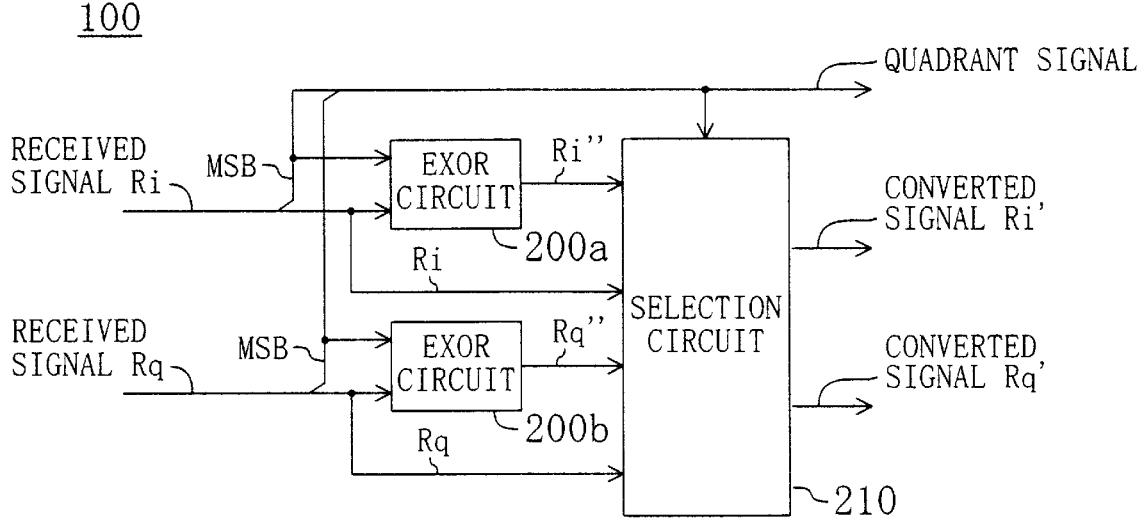
FIG. 4 is a block diagram showing in detail another example of the configuration of the signal conversion circuit in FIG. 2.

Reference is now made to FIG. 4 which shows in detail another example of the configuration of the signal conversion circuit 100 in FIG. 2. The signal conversion circuit 100 of FIG. 4 converts, when the received signal point R(Ri, Rq) is situated in other than the first quadrant, the received signal point R into the signal point R'(Ri', Rq') in the first quadrant by making utilization of any one of a 90, a 180, and a 270 degree rotation centered on the origin of the complex plane. The signal conversion circuit 100 comprises, in addition to the two EXOR circuits 200a and 200b, a selection circuit 210. The rules of signal point conversion in such a case are as follows.

(1) If R is in the first quadrant, then R is not altered and becomes R'. That is:

$(Ri', Rq')=(Ri, Rq)$;

(2) If R is in the second quadrant, then R is subjected to a 270 degree rotation and becomes R'. That is:

$(Ri', Rq')=(Rq, Ri'')$;

(3) If R is in the second quadrant, then R is subjected to a 180 degree rotation and becomes R'. That is:

$(Ri', Rq')=(Ri'', Rq'')$;

(4) If R is in the fourth quadrant, then R is subjected to a 90 degree rotation and becomes R'. That is:

$(Ri', Rq')=(Rq\Delta, Ri)$;

where Ri" and Rq" are components derived from subjecting the I component Ri and the Q component Rq of the received signal point R to one's complement processing. The sign bit (MSB) of each of the components Ri and Rq is used to decide in which of the quadrants the received signal point R is situated. The signal conversion circuit 100 outputs both the sign bits used in such quadrant decision as a 2-bit quadrant signal for storage in the first storage circuit 103.

Figure 5:
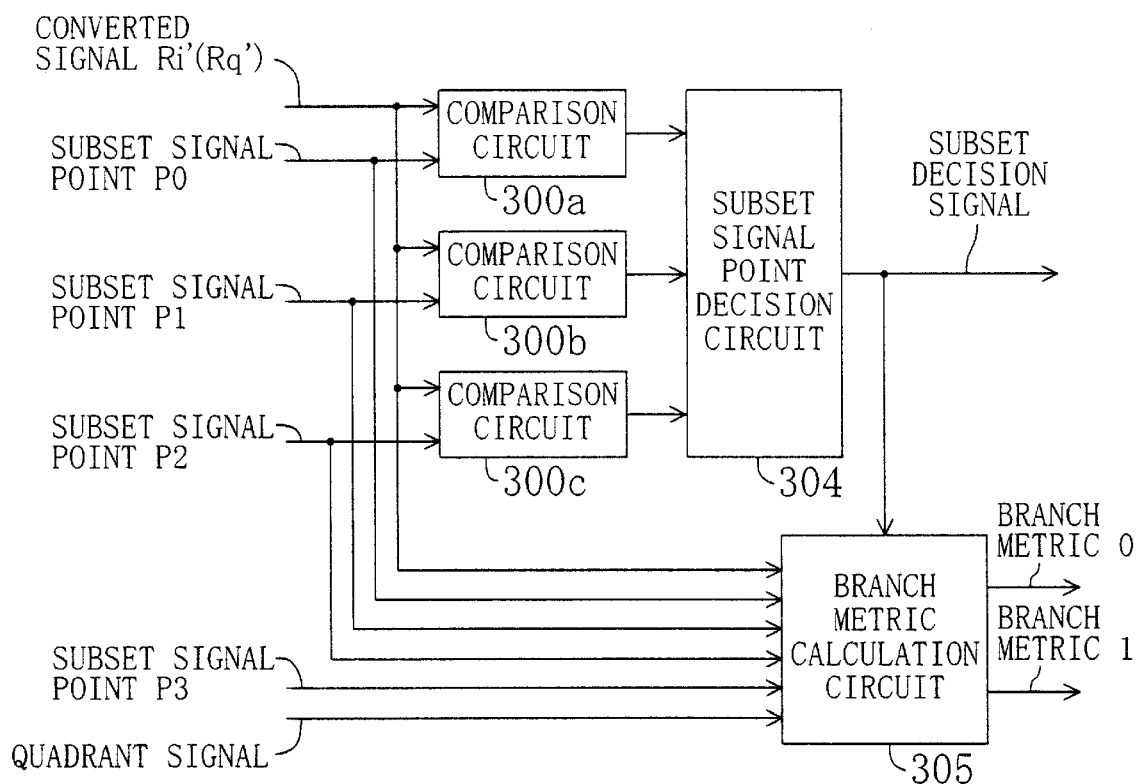
FIG. 5 is a block diagram showing in detail an example of the configuration of a branch metric arithmetic circuit in FIG. 2.

FIG. 5 shows in detail an example of the configuration of the branch metric arithmetic circuit 101 in FIG. 2. The branch metric arithmetic circuit 101 of FIG. 5 comprises three comparison circuits 300a, 300b, and 300c, a subset signal point decision circuit 304, and a branch metric calculation circuit 305. The comparison circuit 300a compares the I component Ri' (and the Q component Rq') of the converted signal point R' with a subset signal point P0. The comparison circuit 300b compares the I component Ri' (and the Q component Rq') of the converted signal point R' with a subset signal point P1. The comparison circuit 300c compares the I component Ri' (and the Q component Rq') of the converted signal point R' with a subset signal point P2. The subset signal point decision circuit 304 outputs, based on the outputs of the three comparison circuits 300a, 300b, and 300c, a subset decision signal for the I component (and the Q component) for storage in the second storage circuit 104. Here, since it is sufficient for the I component subset decision signal to be able to identify any one of the four decision regions I0, I1, I2, and I3 (see FIG. 1), the I component subset decision signal is a signal of two bits. Likewise, since it is sufficient for the Q component subset decision signal to be able to identify any one of the four decision regions Q0, Q1, Q2, and Q3 (see FIG. 1), the Q component subset decision signal is a signal of two bits. The branch metric calculation circuit 305 uses the subset decision signal and the quadrant signal to calculate I component branch metrics 0 and 1 and Q component branch metrics 0 and 1. The description will be made concretely on the I component based on the example of FIG. 1 and the subset decision signal that is applied to the branch metric calculation circuit 305 indicates that the converted signal point R' is situated in the decision region I3. At this time, the branch metric calculation circuit 305 defines the Euclidean distance between the subset signal point with a value C3=0 (P2) and the converted signal point R' as a branch metric 0 and the Euclidean distance between the subset signal point with a value C3=1 (P3) and the converted signal point R' as a branch metric 1. However, the quadrant signal output from the signal conversion circuit 100 indicates that the received signal point R is situated not in the first quadrant but in the third quadrant. To cope with this, the branch metric calculation circuit 305 performs switching between the previously-found branch metrics 0 and 1. Also with respect to the Q component, the same switching operation is carried out by the branch metric calculation circuit 305. These operations reflect that, whereas a most likelihood signal point for the converted signal point R' (FIG. 1) is a signal point (110,000) with a value C3=0 and a value C0=0, a most likelihood signal point for the received signal point R is a signal point (111,001) with a value C3=1 and a value C0=1.

The I component branch metrics 0 and 1 and the Q component branch metrics 0 and 1 are fed to the ACS circuit 102 of FIG. 2. The ACS circuit 102 performs arithmetic operations to compute, from these branch metrics, a path metric according to the trellis diagram and outputs a path selection signal for selection of a path having a high likelihood for storage in the third storage circuit 105. The traceback circuit 106 performs, from a first to a second time point, traceback of the quadrant signal stored in the first storage circuit 103, the subset decision signal stored in the second storage circuit 104, and the path selection signal stored in the third storage circuit 105. Then, the traceback circuit 106 outputs a quadrant decoding signal based on the result of the quadrant signal traceback, an I component/Q component subset decoding signal based on the result of the subset decision signal traceback, and an I component/Q component encoded bit decoding signal based on the result of the path selection signal traceback. With the aid of a simple logic circuit, the reverse conversion circuit 107 converts, by making use of the quadrant decoding signal output from the traceback circuit 106, the I component/Q component subset decoding signal to provide a non-encoded bit decoding signal restored in the quadrant of the received signal point R. The encoded bit decoding signal and the non-encoded bit decoding signals obtained in the way as described above are the decoding results of the received signal.

Figure 6:
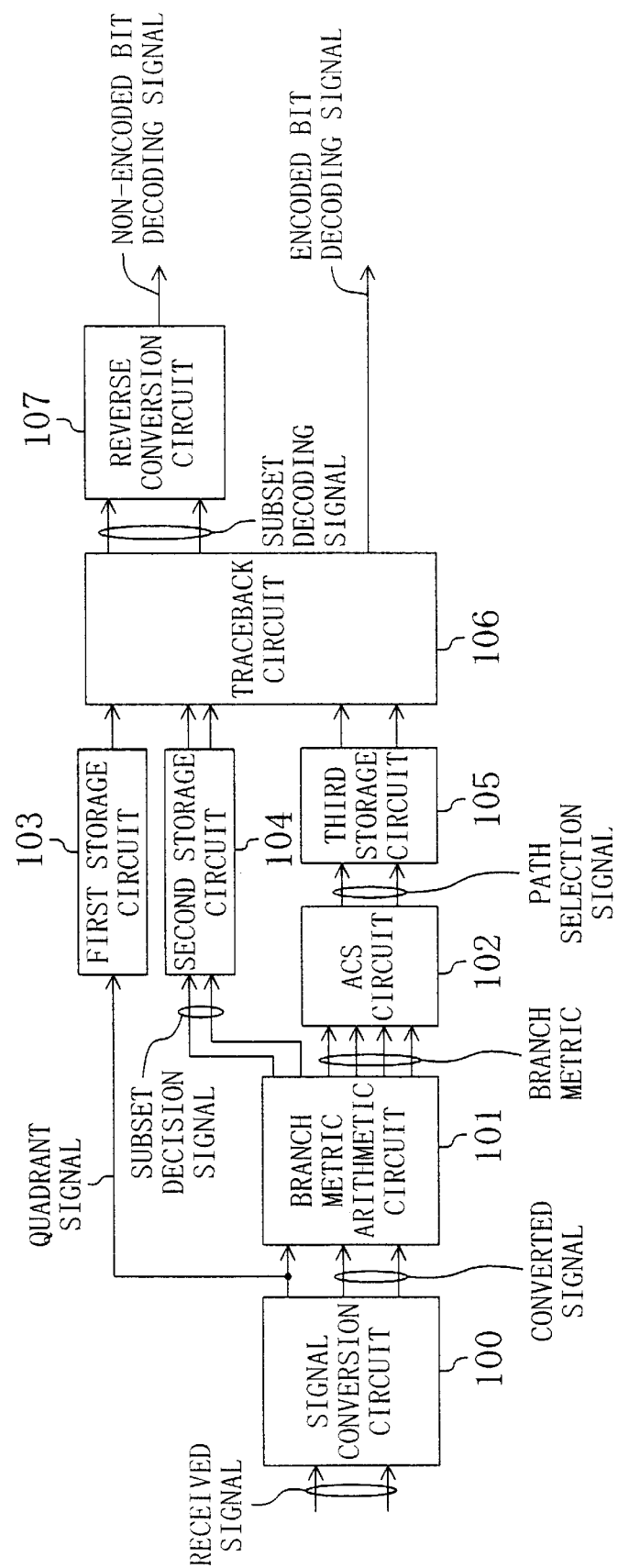
FIG. 6 is a block diagram showing another example of the configuration of the trellis decoder according to the present invention.
Figure 7:
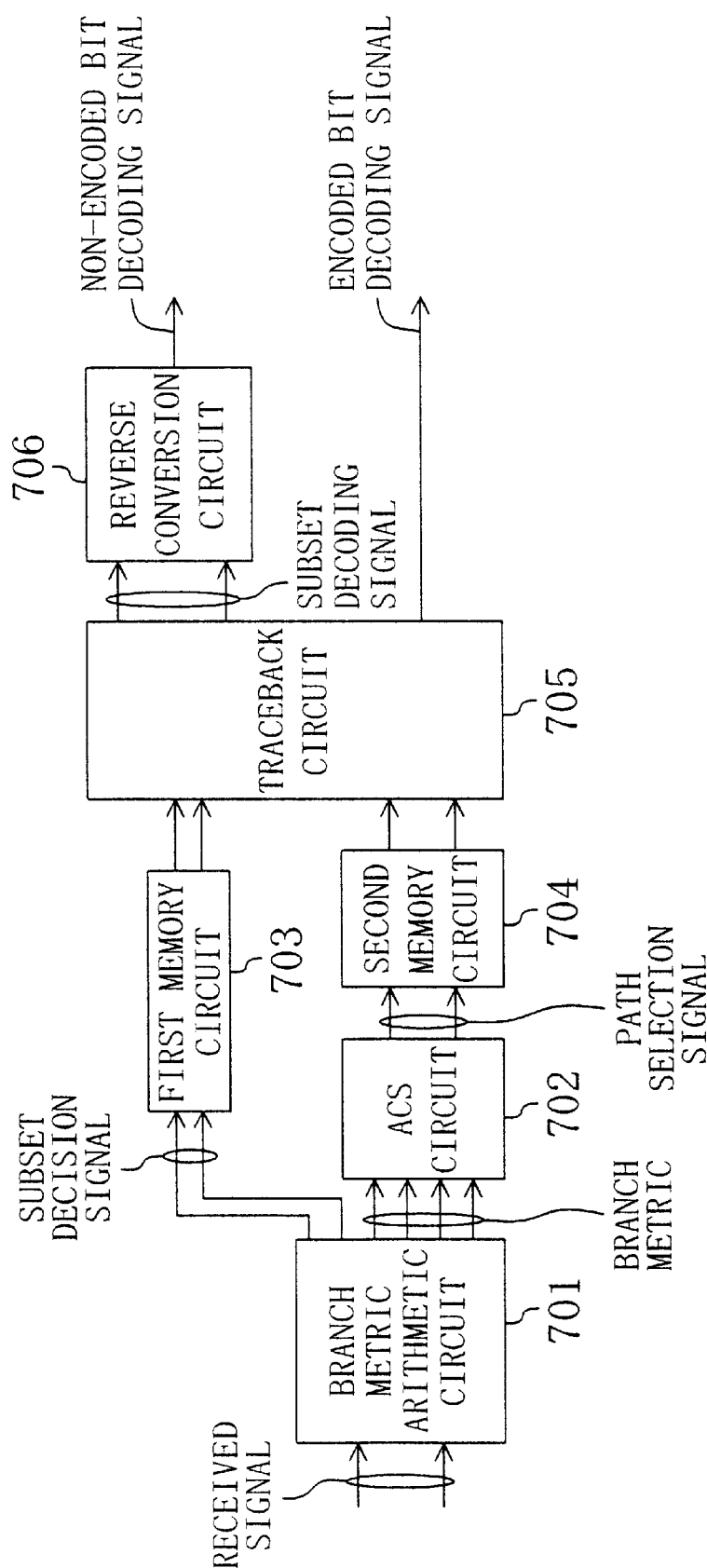
FIG. 7 is a block diagram showing the configuration of a conventional trellis decoder.
Figure 8:
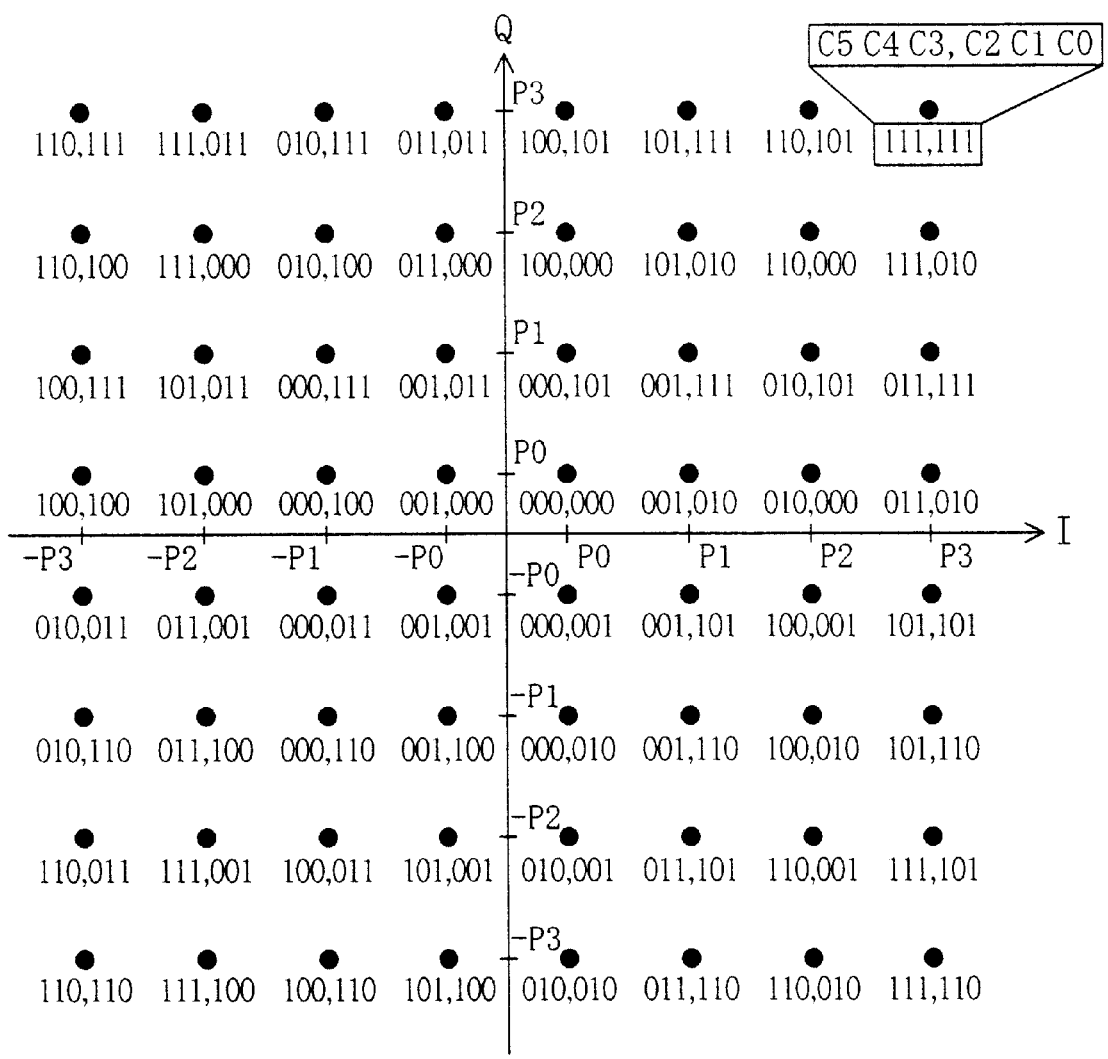
FIG. 8 is a 64 QAM signal point diagram.
Figure 9:
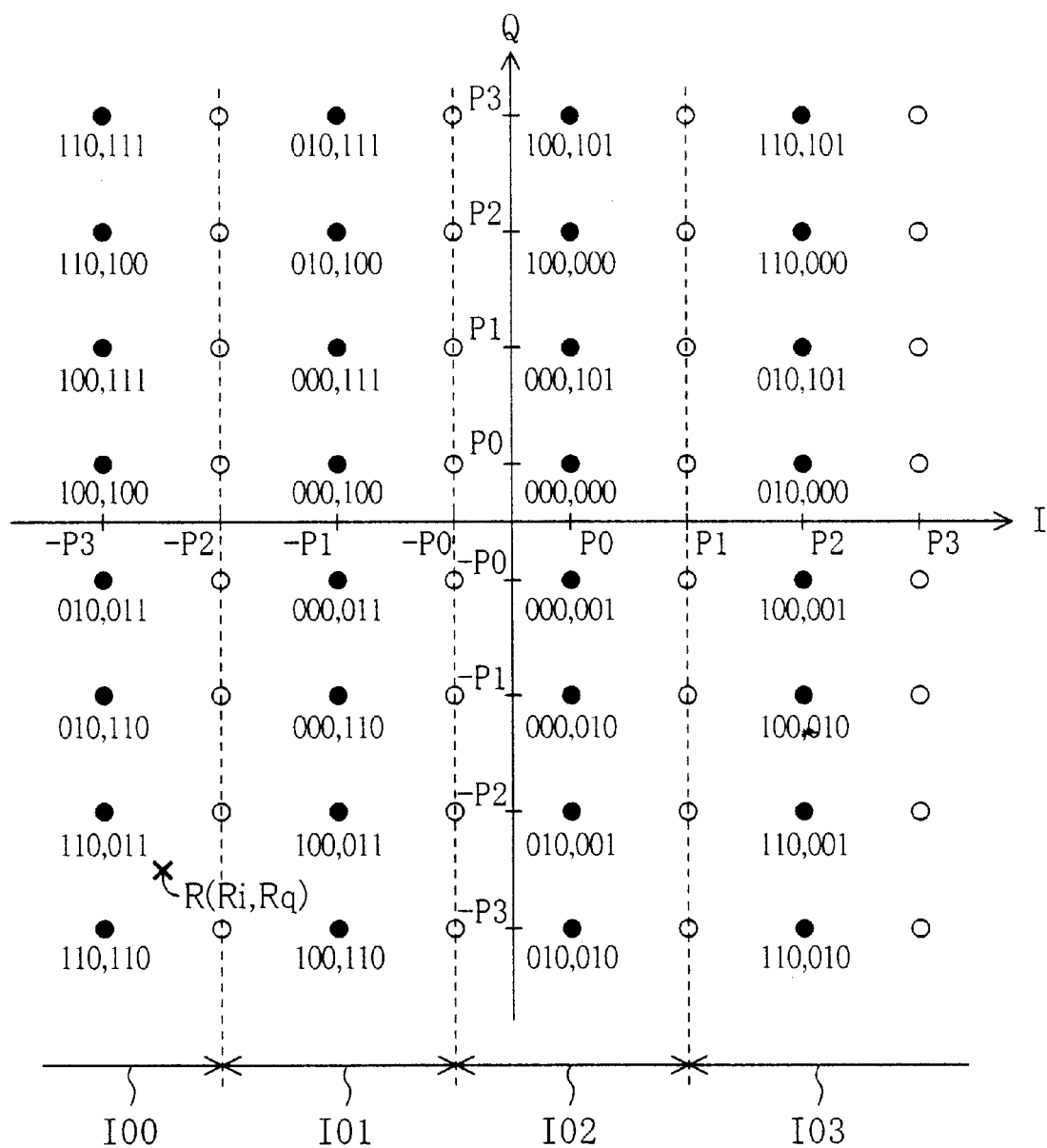
FIG. 9 is an operation descriptive diagram of the conventional trellis decoder of FIG. 7.

FIG. 6 shows another example of the configuration of the trellis decoder according to the present invention. The signal conversion circuit 100, the branch metric arithmetic circuit 101, the ACS circuit 102, the first storage circuit 103, the second storage circuit 104, and the third storage circuit 105 of FIG. 6 function in the same way as their counterparts shown in FIG. 2. According to the example of FIG. 6, the traceback circuit 106 performs, from a first to a second time point, traceback of the quadrant signal stored in the first storage circuit 103, the subset decision signal stored in the second storage circuit 104, and the path selection signal stored in the third storage circuit 105. Then, the traceback circuit 106 outputs an I component/Q component subset decoding signal based on the result of the quadrant signal traceback and on the result of the subset decision signal traceback and an I component/Q component encoded bit decoding signal based on the result of the path selection signal traceback. With the aid of a conventional logic circuit, the reverse conversion circuit 107 converts the I component/Q component subset decoding signal restored in the quadrant of the received signal point R to provide a non-encoded bit decoding signal.

In both the configurations of FIGS. 2 and 6, by conversion of the received signal point R into the signal point R' in the first quadrant, a comparison circuit used for decision of a subset signal point and incorporated in the branch metric circuit 101 becomes configurable by the three comparison circuits 300a, 300b, and 300c. This makes it possible to cut the circuit scale in half. Moreover, the information content of a subset decision signal becomes the information content of a single quadrant, which makes it possible to reduce the capacity of the second storage circuit 104.

In the foregoing examples, the signal conversion circuit 100 performs conversion of the received signal point R into a signal point in the first quadrant. However, it will be sufficient that the signal conversion circuit 100 performs conversion of the received signal point R into a signal point in any one of the four quadrants.

Furthermore, the distance between a converted signal point and a subset signal point for branch metric calculation by the branch metric arithmetic circuit 101 has been described in terms of the Euclidean distance. Instead of using the Euclidean distance, the Hamming distance may be employed. However, the use of the Euclidean distance provides higher-accuracy maximum likelihood decision than using the Hamming distance, therefore reducing the possibility that erroneous decoding results occur.

Further, the quadrant signal, the subset decision signal, and the path selection signal have been described such that these signals are stored in the first, second, and third storage circuits 103, 104, and 105, respectively. However, these storage circuits may be combined into a single storage circuit for storage of the signals.

Additionally, the description has been made such that the result of the path selection signal traceback by the traceback circuit 106 is output intact as an I component/Q component encoded bit decoding signal. However, depending on the way of defining the path selection signal output from the ACS circuit 102, it is possible to employ a configuration by which the result of the path selection signal traceback is inverted and output as an encoded bit decoding signal.

What is claimed is:

1. A trellis decoder for performing decoding of a trellis encoded modulated signal, comprising:

signal conversion means for converting a received signal point into a converted signal point situated in any one of all quadrants on a complex plane specified by a real and an imaginary number axis and for outputting said converted signal point and a quadrant signal representative of a quadrant where said received signal point is situated;

branch metric arithmetic means for deciding, by making use of said quadrant signal, the maximum likelihood between said converted signal point and a subset signal point and for outputting a branch metric and a subset decision signal;

ACS (Add Compare Selection) means for performing arithmetic operations to compute, from said branch metric, a path metric according to a trellis diagram and for outputting a path selection signal for selection of a path having a high likelihood;

first storage means for storing said quadrant signal;

second storage means for storing said subset decision signal;

third storage means for storing said path selection signal; and output means for outputting an encoded bit decoding signal and a non-encoded bit decoding signal by making use of results of performing traceback of said quadrant signal stored in said first storage means, said subset decision signal stored in said second storage means, and said path selection signal stored in said third storage means.

2. The trellis decoder of claim 1, said output means including:

traceback means for performing, from a first to a second time point, traceback of said quadrant signal stored in said first storage means, said subset decision signal stored in said second storage means, and said path selection signal stored in said third storage means and for outputting a quadrant decoding signal based on the result of said quadrant signal traceback, a subset decoding signal based on the result of said subset decision signal traceback, and said encoded bit decoding signal based on the result of said path selection signal traceback; and reverse conversion means for converting, by making use of said quadrant decoding signal, said subset decoding signal to provide said non-encoded bit decoding signal.

3. The trellis decoder of claim 1, said output means including:

traceback means for performing, from a first to a second time point, traceback of said quadrant signal stored in said first storage means, said subset decision signal stored in said second storage means, and said path selection signal stored in said third storage means and for outputting a subset decoding signal based on the result of said quadrant signal traceback and on the result of said subset decision signal traceback and said encoded bit decoding signal based on the result of said path selection signal traceback; and reverse conversion means for converting said subset decoding signal to provide said non-encoded bit decoding signal.

4. The trellis decoder of claim 1, wherein said signal conversion means performs said signal point conversion by making utilization of foldback with respect to said real number axis and/or said imaginary number axis.

5. The trellis decoder of claim 1, wherein said signal conversion means performs said signal point conversion by making utilization of any one of a 90, a 180, and a 270 degree rotation centered on the origin of said complex plane.

6. The trellis decoder of claim 1, wherein said branch metric arithmetic means performs said maximum likelihood decision by the Hamming distance.

7. The trellis decoder of claim 1, wherein said branch metric arithmetic means performs said maximum likelihood decision by the Euclidean distance.

8. A trellis decoding method for performing decoding of a trellis encoded modulated signal, comprising:

a signal conversion step of converting a received signal point into a converted signal point situated in any one of all quadrants on a complex plane specified by a real and an imaginary number axis and for outputting said converted signal point and a quadrant signal representative of a quadrant where said received signal point is situated;

a branch metric arithmetic step of deciding, by making use of said quadrant signal, the maximum likelihood between said converted signal point and a subset signal point and for outputting a branch metric and a subset decision signal;

an ACS (Add Compare Selection) step of performing arithmetic operations to compute, from said branch metric, a path metric according to a trellis diagram and for outputting a path selection signal for selection of a path having a high likelihood; and an output step of outputting an encoded bit decoding signal and a non-encoded bit decoding signal by making use of results of performing traceback of said quadrant signal stored in first storage means, said subset decision signal stored in second storage means, and said path selection signal stored in third storage means.

9. The trellis decoding method of claim 8, said output step including:

a traceback step of performing, from a first to a second time point, traceback of said quadrant signal stored in said first storage means, said subset decision signal stored in said second storage means, and said path selection signal stored in said third storage means and for outputting a quadrant decoding signal based on the result of said quadrant signal traceback, a subset decoding signal based on the result of said subset decision signal traceback, and said encoded bit decoding signal based on the result of said path selection signal traceback; and a reverse conversion step Of converting, by making use of said quadrant decoding signal, said subset decoding signal to provide said non-encoded bit decoding signal.

10. The trellis decoding method of claim 8,
said output step including:
   a traceback step of performing, from a first to a second time point, traceback of said quadrant signal stored in said first storage means, said subset decision signal stored in said second storage means, and said path selection signal stored in said third storage means and for outputting a subset decoding signal based on the result of said quadrant signal traceback and on the result of said subset decision signal traceback and said encoded bit decoding signal based on the result of said path selection signal traceback; and
   a reverse conversion step of converting said subset decoding signal to provide said non-encoded bit decoding signal.

* * * * *